(12) United States Patent
McDonald (10) Patent No.: US 10,721,311 B1
(45) Date of Patent: Jul. 21, 2020

(54) SYSTEM AND METHOD FOR COUPLING TWO SEPARATE APPLICATIONS TO AN APPLICATION SESSION WITHIN A SERVERLESS INFRASTRUCTURE

(71) Applicant: Accenture Global Solutions Limited, Dublin (IE)

(72) Inventor: John Austin McDonald, Chicago, IL (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/428,730

(22) Filed: May 31, 2019

Related U.S. Application Data (60) Provisional application No. 62/791,525, filed on Jan. 11, 2019.

(51) Int. Cl.
*G06F 15/16* (2006.01)
*H04L 29/08* (2006.01)
*H04L 29/06* (2006.01)

(52) U.S. Cl.
CPC ........ *H04L 67/148* (2013.01); *H04L 63/0815* (2013.01); *H04L 67/142* (2013.01); *H04L 67/146* (2013.01); *H04L 67/147* (2013.01)

(58) Field of Classification Search
CPC ............ G06N 20/00; G06N 3/04; G06N 3/08; G06N 20/20; G06N 3/006; G06N 3/02; H04L 67/02; H04L 67/10; H04L 67/22; H04L 63/10; H04L 67/12; H04L 67/42; H04L 43/0876; H04L 43/0894
See application file for complete search history.

(56) References Cited

U.S. PATENT DOCUMENTS

| | | | |
|---|---|---|---|
| 2003/0099014 A1* | 5/2003 | Egner | H04J 14/0227 398/79 |
| 2015/0363607 A1* | 12/2015 | Yang | H04L 63/062 713/165 |
| 2016/0110754 A1* | 4/2016 | Miyazaki | G06F 8/61 705/14.39 |
| 2016/0226999 A1* | 8/2016 | Johnsen | H04L 67/16 |
| 2017/0085412 A1 | 3/2017 | Greene | |
| 2018/0196867 A1* | 7/2018 | Wiesmaier | G06F 9/52 |

OTHER PUBLICATIONS

Justin Baker, "Serverless Websockets with AWS Lambda & Fanout", published Jan. 4, 2018; https://hackernoon.com/serverless-websockets-with-aws-lambda-fanout-15384bd30354 [retrieved Oct. 1, 2019].

* cited by examiner

*Primary Examiner* — Michael A Keller
*Assistant Examiner* — Thao D Duong
(74) *Attorney, Agent, or Firm* — Plumsea Law Group, LLC (57) ABSTRACT

A system and method for coupling two separate applications to an application session within a serverless infrastructure is disclosed. For example, the system and method may couple one or more applications to one or more devices, such as Internet of Things devices, within a serverless infrastructure. Embodiments provide a method and system that have the technological advantage of increased processing speed and reduced costs.

20 Claims, 4 Drawing Sheets

| VERIFICATION TOKEN | HARDWARE ID | SESSION ID |
|---|---|---|
| 1234 | A-15648 | 17599235754829 |
| ... | ... | ... |

SYSTEM AND METHOD FOR COUPLING TWO SEPARATE APPLICATIONS TO AN APPLICATION SESSION WITHIN A SERVERLESS INFRASTRUCTURE

CROSS REFERENCE TO RELATED APPLICATION

This application claims the benefit of U.S. Provisional Patent Application No. 62/791,525, filed Jan. 11, 2019, and titled "System and Method for Coupling Two Separate Applications to an Application Session Within a Serverless Infrastructure," which is incorporated by reference herein in its entirety.

TECHNICAL FIELD

The present disclosure relates to coupling two separate applications within a serverless infrastructure. More specifically, the present disclosure relates to pairing devices such as Internet of Things devices with a session of an application within a serverless infrastructure.

BACKGROUND

A cloud-computing system may have a serverless infrastructure. More specifically, a serverless infrastructure may be a cloud-computing execution system in which the cloud provider acts as the server, dynamically managing the allocation of machine resources. Pricing is based on the actual amount of resources consumed by a computer software application (application) instead of pre-purchased units of capacity, so that resources are used by a customer on an as-needed basis. Because the resources can be consumed on an as-needed basis, this provides customers with scalable resources, which is very attractive to customers from a cost perspective.

The use of a cloud-computing execution system presents a technical challenge to application development when real-time streaming communications mechanisms are required between Internet of Things (IOT) devices and specific sessions of an application. Most solutions to this technical problem are polling and/or placing a proxy in the middle. Polling relates to the continuous checking of software programs and/or devices by one software program or device to determine the state of other software programs or devices. An example of a state may be whether a software program or device is still connected and wishes to communicate. For example, in order to implement streaming services such as Netflix or Hulu, a set top (e.g. set top box) requests that a unique code be entered by a user. The code is associated with the account and posted to a serverless backend. On the subsequent poll, the update may be found and successfully acknowledged. Subsequent polling happens on an interval and is processor intensive while the polling is executed. The more frequently polling is performed, the more processor power is required. However, if polling is performed less frequently, then it takes longer for the application to recognize a change of state. Accordingly, polling creates a tradeoff between increased cost (for more frequent polling) or reduced application performance (for less frequent polling).

A proxy may be a software design pattern or device, which can interface to another application or device. Placing a proxy in the middle may severely impact application performance or increase costs.

While a serverless environment presents the before-mentioned technical challenges, a traditional server implementation (e.g., dedicated server implementation) poses a different set of challenges. Specifically, a traditional server implementation is expensive in comparison to a serverless environment because the availability of the resources is paid for in a traditional server implementation even when the resources are not being used.

There is a need in the art for a system and method that addresses the shortcomings of the prior art discussed above.

SUMMARY

A system and method for controlling a first application using a second application within a serverless infrastructure is disclosed. Embodiments provide a method and system that have the technological advantage of increased processing speed. Specifically, the disclosed system and method provides a serverless infrastructure that can perform with the responsiveness of a real-time connection traditionally associated with a traditional server implementation (e.g., a dedicated server implementation). The disclosed system and method also provide the advantage of reduced costs in comparison to a dedicated server implementation. This is because the disclosed system and method incorporate a serverless infrastructure that is only paid for based on actual usage of resources instead of the availability of resources. Embodiments provide the speed and efficient use of processing resources of the traditional server implementation while avoiding the costs and maintenance of the traditional server implementation.

In one aspect, a method of controlling a first application running on a client device using commands generated by a second application running on a control device in a serverless infrastructure, where the control device includes a device identifier, is disclosed. The method includes establishing a connection between the first application and a server configured to accommodate a break in connection between the client device and the control device, where the connection is associated with a session identifier. The method also includes sending the session identifier from the server to a first lambda service, where the first lambda service has access to verification information associated with the session identifier. The method also includes storing the session identifier and the verification information, using the first lambda service, in a database. The method also includes receiving the verification information at the second application running on the control device. The method also includes sending the verification information to a second lambda service and using the second lambda service to store the device identifier on the database. The second lambda service uses the verification information to associate the device identifier with the session identifier. The method also includes receiving a command intended for use by the first application at the second application running on the control device and sending the command to the second lambda service. The method also includes using the second lambda service to retrieve the session identifier from the database, where the device identifier is used to find the session identifier. The method further includes sending the command and the session identifier, using the second lambda service, to the server so that the first application can receive the command from the server, and executing the command using the first application.

In another aspect, the embodiments provide a non-transitory computer-readable medium storing software including instructions executable by one or more computers which, upon such execution, cause the one or more computers to: (1) establish a connection between a first application running on a client device and a server, where the connection is associated with a session identifier; (2) send the session identifier from the server to a first lambda service; (3) store the session identifier, using the first lambda service, together with corresponding verification information in the database; (4) receive the verification information at a second application running on a control device, the control device including a device identifier; (5) send the verification information to a second lambda service; (6) use the second lambda service to store the device identifier on the database, where the second lambda service uses the verification information to associate the device identifier with the session identifier; (7) receive a command intended for use by the first application at the second application running on the control device; (8) send the command to the second lambda service; (9) use the second lambda service to retrieve the session identifier from the database based on the device identifier; (10) send the command and the session identifier, using the second lambda service, to the server so that the first application can receive the command over the established connection; and (11) execute the command using the first application.

In another aspect, a system for controlling a first application using commands generated by a second application in a serverless infrastructure includes a client device running the first application and a server configured to facilitate messages to and from the client device using a session identifier. The system also includes a first lambda service to receive the session identifier via the server, a database to store the session identifier together with corresponding verification information, a control device running the second application to receive commands from a user and to receive the verification information from the user, and a second lambda service to receive the commands and verification information from the control device and to retrieve the session identifier using the verification information. The system can pass commands from the control device to the client device to control the first application.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

A system and method for controlling a first application with a second application within a serverless infrastructure is disclosed. For example, the system and method may couple one or more applications to one or more devices, such as Internet of Things devices (IoT devices), within a serverless infrastructure. In one or more embodiments, a session identifier (session ID) and verification method are used to verify and connect the application to the devices. The verification method may include any type of verification identifier, such as a token or password. In another example, the verification method may include a biometric verification method including a biometric identifier, such as a fingerprint. Using the appropriate verification method (for example, providing a verification token), a lambda service can retrieve a corresponding session ID in database. Then, the lambda service can pass messages, including commands from the IoT device, to the appropriate client using the session ID. By coupling two separate applications according to the disclosed system and method, a first application can be remotely accessed and/or controlled by a second application in a secure environment. Furthermore, a first application can be remotely accessed and/or controlled by a second application in a serverless environment with the responsiveness of a real-time connection traditionally associated with a traditional server implementation (e.g., a dedicated server implementation).

Figure 1:
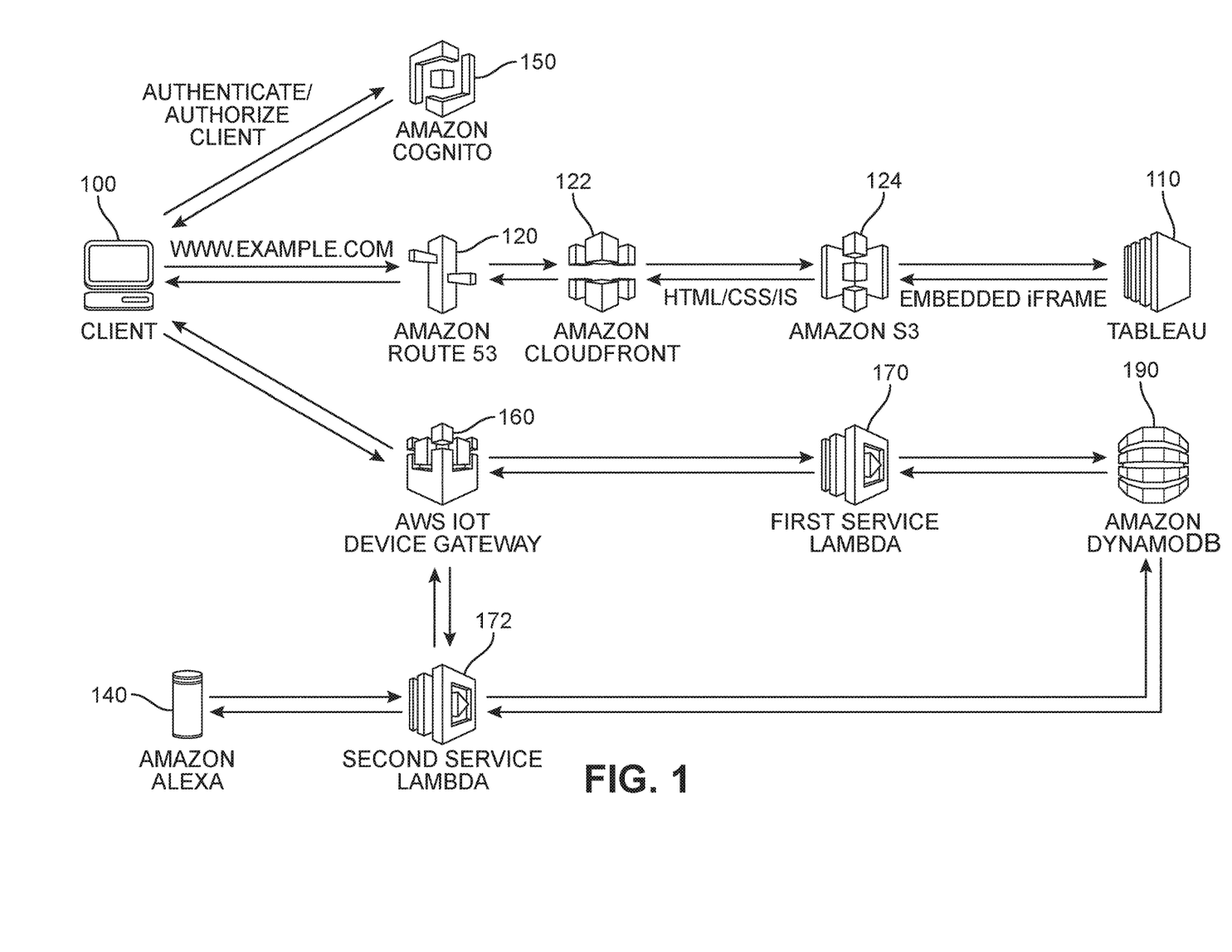
FIG. 1 is a diagram of an embodiment of a system including a serverless infrastructure.

FIG. 1 is a schematic view of a configuration intended to demonstrate how the disclosed system can be used to control a first application using a second application within a serverless infrastructure. In this example, the first application is a web application that provides an interface for viewing data visualizations generated in a cloud based tool (Tableau). The second application runs on Amazon Alexa and can be used to send audible commands to the web application. Based on commands received from the second application, the web application can then update the data visualizations displayed on the client device.

The exemplary configuration shown in FIG. 1 could be useful for presenting graphs and charts at a meeting. For example, using this configuration multiple attendees of the meeting could give audible commands to Amazon Alexa in order to change the Tableau graphs or charts being viewed on the client device.

Figure 2:
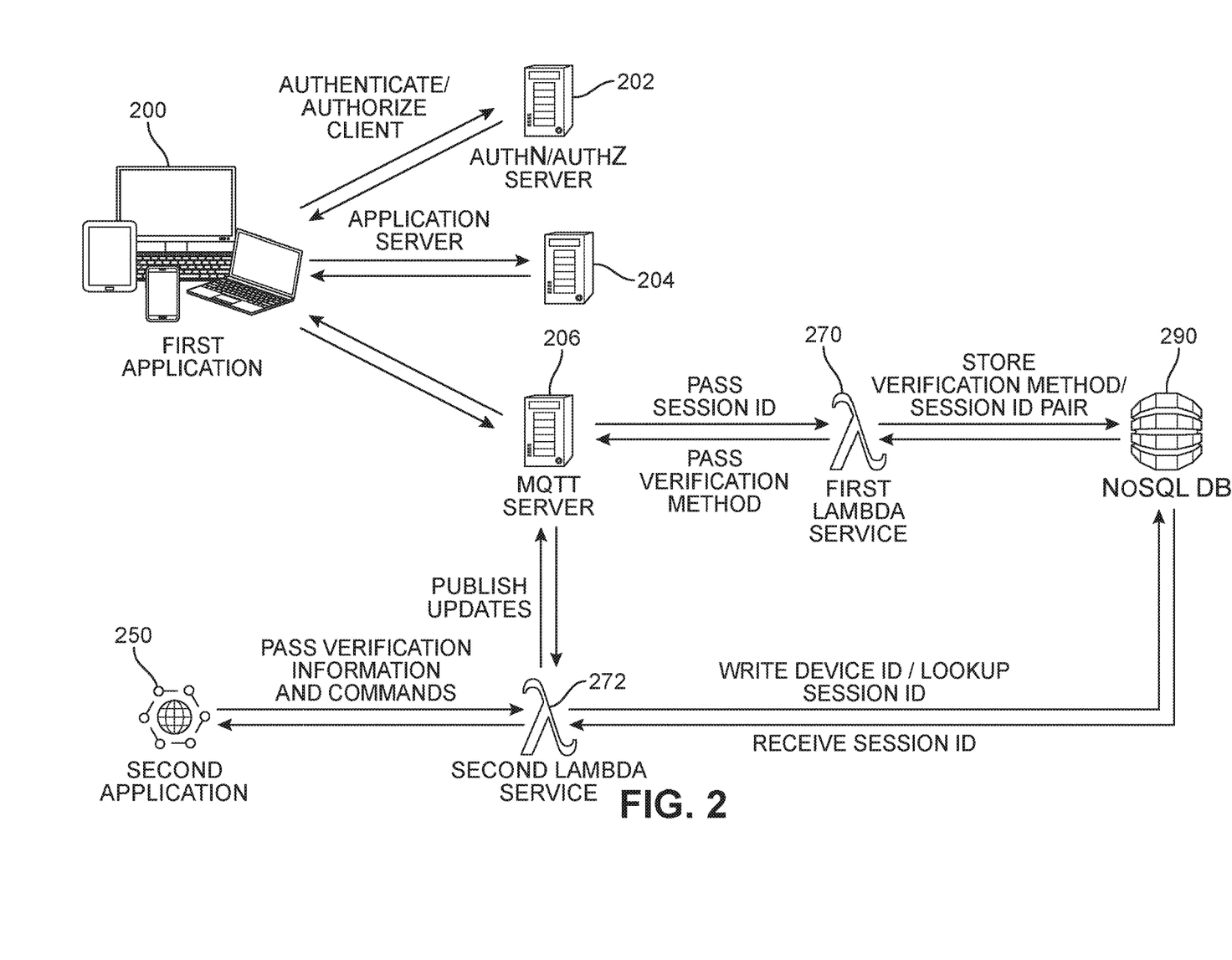
FIG. 2 is a diagram of another embodiment of a system including a serverless infrastructure.

It should be understood that this example is meant to make the disclosed system relatable and is not meant to be limiting. A more general setup is depicted in FIG. 2 and discussed further below. There, a first application running on any platform or device can be coupled with a second application within a serverless infrastructure, thereby allowing the second application to send commands to the first application. The second application could be associated with an IoT device, or could run on any other computing platform, such as a laptop or mobile device.

Referring now to FIG. 1, a first device may be client device 100 (also referred to as a "host"). Client device 100 could be any kind of computing device, such as a desktop, a laptop, a tablet, a mobile phone or any other computing device.

Client device 100 may run a first application. As an example, in the present embodiment the first application may be a web application running within a browser on client device 100. In this example, the web application provides an interface for viewing data visualizations generated by Tableau. In some embodiments, Tableau may run as a cloud service on a remote application server 110. The web application may incorporate an embedded iFrame displaying a Tableau instance that can be updated based on commands sent to remote application server 110 by the web application.

In the exemplary embodiment, various Amazon services are used to serve and manage the web application. These include, for instance, the Amazon Route 53 service 120, the Amazon CloudFront service 122, and the Amazon S3 service 124. Here, Amazon Route 53 service 120 is an example of a cloud-based domain name service which provides a path to an application. The Amazon CloudFront service 122 and the Amazon S3 124 serve webpages and store content, respectively.

Although the exemplary embodiment depicts a web application running on client device 100, in other embodiments client device 100 may run any other kind of application that may be hosted on an application server. In still other embodiments, client device 100 could run applications that are stored on the client device (for example, a native app running on a mobile device).

As seen in FIG. 1, a second device may be an Internet of Things (IoT) device 140. In this specific example, IoT device 140 may be Amazon Alexa as shown in FIG. 1. It is noted that Amazon Alexa can be controlled by voice commands. An IoT device can include any computing device such as a desktop computer, a television, a smartphone, a tablet, a smartwatch, a smart glass, a smart helmet, and a laptop.

The second device may be configured to run a second application. The second application could be any application that may be used to send information to the first application running on client device 100. In an exemplary embodiment, the second application could be an application running on Amazon Alexa. For example, the second application could be an Alexa application configured to receive voice commands, process the commands into text, and send the commands in text form to another device, server, system or service for forwarding to the first application.

In FIG. 1, client device 100 may use a security application to provide secure access to one or more other applications or services. In the exemplary embodiment, client device 100 may use Amazon Cognito 150, which uses a login and password to provide secure access to an application session.

The exemplary configuration includes provisions for transmitting instructions, commands or other kinds of information from IoT device 140 to client device 100. To facilitate this flow of information, client device 100 may be in communication with AWS IoT Device Gateway 160, or simply "device gateway 160". Device gateway 160 comprises a server, service or system that facilitates exchanging messages between applications and/or devices using a known protocol. Exemplary protocols include the Message Queuing Telemetry Transport (MQTT) protocol, the Web-Sockets protocol, and the HTML 1.1 protocol. Device gateway 160 could comprise a server, virtual server, or any other computing system capable of facilitating communication. Device gateway 160, as well as other types of MQTT servers, may be designed for instances where there will be interruptions in the communication between components, which is typical of IoT devices such as Amazon Alexa. In other words, these types of servers can accommodate a break in connection between the client device and the control device. Although device gateway 160 may operate from a server in some embodiments, it may be appreciated that device gateway 160 may not comprise a dedicated server, so that users may only pay for gateway services on a per-use basis.

In some embodiments, client device 100 may establish a connection with device gateway 160. In some embodiments, this connection may be a WebSockets connection. In other embodiments, any other communication protocol could be used to transfer messages or other information between client device 100 and device gateway 160.

Traditional configurations may use a dedicated server and/or proxy to manage the state of communication between IoT device 140 and device gateway 160 (or directly with client device 100). However, the exemplary embodiments provide a serverless infrastructure that is capable of managing state information that ensures that 1) a selected IoT device can obtain session information (such as a session ID) to pass messages to client device 100 through device gateway 160, and 2) only verified devices are able to obtain session information.

To accomplish the above features, the embodiments employ several components that operate without dedicated servers while being configured to manage state information for the system. These components include a first lambda service 170 and a second lambda service 172. These lambda services may be implemented as lambda functions that can be invoked when needed. In some cases, each lambda service may be dedicated to performing a specific set of functions with minimal computing resources compared to traditional server-based systems. In some cases, these lambda services may be invoked by event triggers originating at device gateway 160 and/or client device 100, as described in further detail below.

Additionally, the configuration includes a database 190. In some embodiments, database 190 may be a NoSQL database. However, other implementations could use any other kind of database architecture. More generally, database 190 may comprise any database that allows for global secondary indexing. In the exemplary embodiment, database 190 is an Amazon Dynamo database, which provides global secondary indexing.

As seen in FIG. 1, information may pass between device gateway 160 and first lambda service 170, and between first lambda service 170 and database 190. Also, information can pass between IoT device 140 and second lambda service 172, between second lambda service 172 and device gateway 160, and between second lambda service 172 and database 190. Further details regarding the flow of information between components is described in further detail below and depicted schematically in FIGS. 3 and 5.

Many of the components presented in the configuration of FIG. 1 are associated with the Amazon Web Services (AWS) platform. However, similar implementations could be achieved using suitable components from other development platforms (e.g., Google or Azure).

FIG. 2 is a schematic view of another embodiment of a serverless infrastructure, which couples a primary (or first) application to one or more devices (e.g., Internet of Things devices) and/or one or more secondary applications, which may include a second application. As shown in FIG. 2, a first application 200 may be in communication with an authentication/authorization server 202, an application server 204, and a MQTT server 206. For example, first application 200 may include any application executed on any type of platform.

First application 200 could be a web application, a desktop application, and/or a mobile application. The platform may be supported by any type of device. A device includes any computing device such as a desktop computer, a television, a smartphone, a tablet, a smartwatch, a smart glass, a smart helmet, and a laptop.

Any kind of authentication/authorization services could be used, including proprietary services (like Amazon's Cognito) or open source services. Optionally, in some embodiments, no authentication/authorization services may be used.

Application server 204 could be configured to run and/or deliver any kind of applications, including web applications, desktop applications, and/or mobile applications. In some embodiments, first application 200 could run as a native application with no need for a separate application server.

MQTT server 206 may comprise any server configured to facilitate messaging between nodes in a network using the MQTT protocol. Embodiments are not limited to an MQTT server, as other types of messages servers (and/or service) may be used.

A second application 250 may pass messages (including commands) to first application 200 through MQTT server 206. Second application 250 may run on any type control device. In some embodiments, the control device could be desktop computer, a television, a smartphone, a tablet, a smartwatch, a smart glass, a smart helmet, and a laptop. In some embodiments, the remote device could be any kind of Internet of Things device, including, for example, an intelligent voice assistant.

State information, including information to facilitate the verification of an application (or device) and information for managing communication between applications, is retained using lambda services and at least one database, as in the previous embodiment. Referring to FIG. 2, first lambda service 270 is used to couple MQTT server 206 and database 290. Likewise, second lambda service 272 is used to pass information between second application 250, MQTT server 206 and database 290.

Figure 3:
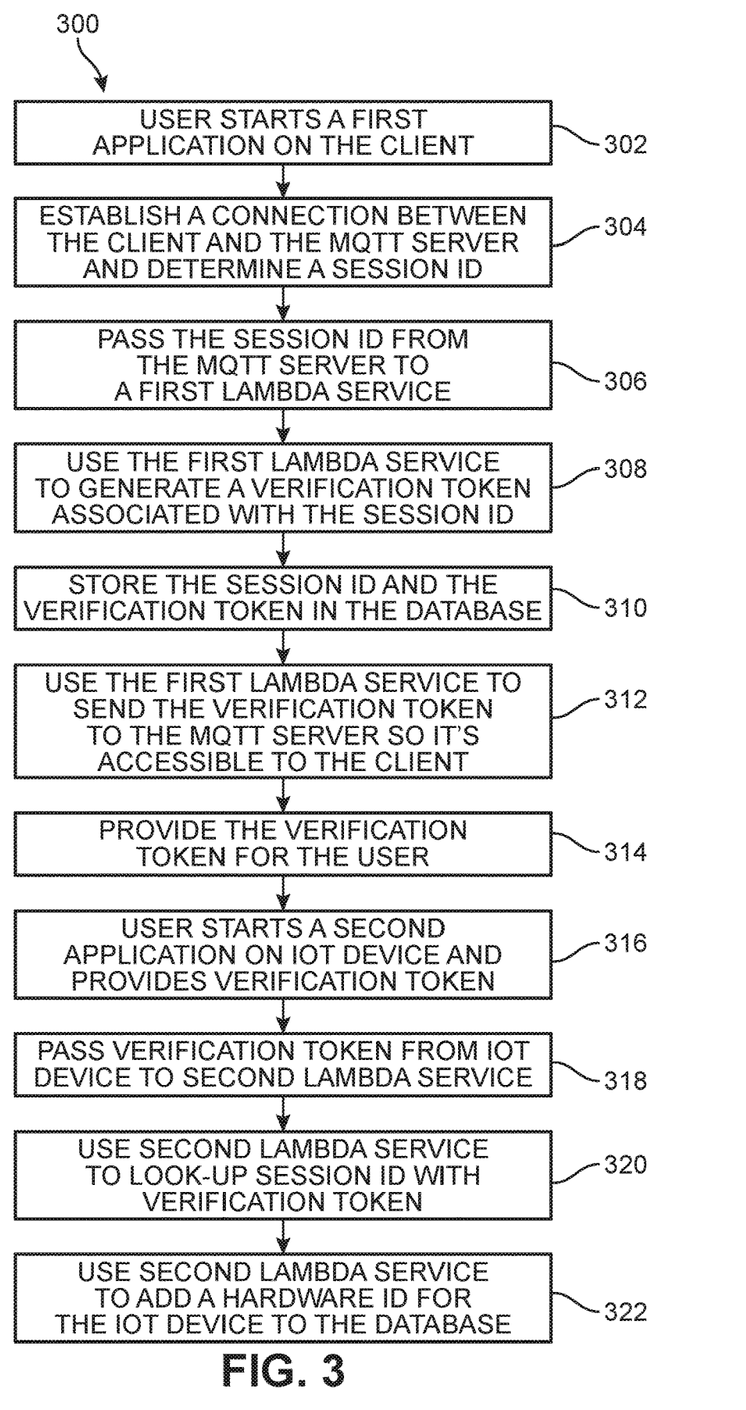
FIG. 3 is a schematic view of process for coupling a first application to a second application, according to an embodiment.

FIG. 3 is a schematic process 300 for coupling a first application with a second application and exchanging information so that the second application can control the first application. This process may be used with any application running on a client (or host) device and any application running on a control device. As used herein, the term "control device" refers to any device running an application intended to send commands or control instructions to another application running on the client. Control devices can include IoT devices, or any other computing devices, including any devices described above.

For clarity, reference is made to the configuration shown in FIGS. 1-2 while discussing the exemplary steps. The process begins at step 302, where a user starts a first application on the client. In some cases, the application could be a web application running in a browser. Such an application may be written in JavaScript or any other language. As in the example configuration of FIG. 1, the web application may provide views of another (third) application running on a remote application server. For example, in the example of FIG. 1, a web application running on a client device may implement an iFrame of an instance of Tableau running within the website. The application running on the client may further include a JavaScript SDK that allows for control of the Tableau instance by making calls to the Tableau application server and updating the client.

In some cases, immediately after starting an application, a user may be prompted to enter a login and password or other identifier using any authentication service or application running on an authentication server (such as authentication/authorization server 202 in FIG. 2). Alternatively, in some cases, the user may be required to provide authentication/authorization information (e.g., to log-in) prior to starting a new application session.

Once a new application session has started, an event trigger within the application may generate a call to connect to an MQTT server (or device gateway). At this point, the MQTT server may pass information about the new session, including a session identifier (or "session ID"), to a first lambda server in step 306. For example, in FIG. 2, MQTT server 206 passes a session ID to first lambda service 270. In some embodiments, the session ID is associated with the socket ID of a WebSocket connection between a client device and the MQTT server. In other embodiments, the session ID could be determined in any other suitable manner.

After receiving the session ID, the first lambda service may generate a verification token in response to the receipt of a session ID in step 308. It may be appreciated that this step may be optional. For example, when the client provides a different verification method (such as a password or biometric information) to be used, no verification token may be generated.

Next, in step 310, the first lambda service may write the session ID and the verification token (or any other kind of verification method) to a database (such as a NoSQL database). Specifically, the first lambda service may use secondary global indexing so that the session ID can be easily retrieved when the token is provided without requiring a scan of the database. For example, in FIG. 2 first lambda service 270 stores the verification method and session ID as a key value pair on database 290.

In step 312, the first lambda service sends the generated verification token back to the MQTT server so that the verification token is accessible by the client. For example, in FIG. 2, the verification method (e.g., a token) is passed back to MQTT server 206 from first lambda server 270. However, it may be appreciated that this step may be skipped some embodiments. For example, if the verification method is provided by the client (e.g., as a password or biometric information), rather than being generated by the first lambda service, then there is no need to pass this information back to the client since the client already has this information.

In step 314, the first application running on the client may provide the verification token to the user. In some cases, the verification token can be displayed for the user on the screen of the client device. It may be appreciated that the token could be provided directly through the first application (for example, a web application) or through other forms. In other embodiments, the verification token could be sent to a user via text or email.

In step 316, the user, who would like to the ability to control the first application with a second application running on any IoT device (or any other control device), may start the second application. When a verification token is requested by the IoT device, the user can input the token provided by the client device (or through some other form of communication). If the token is an alphanumeric string, the user could input this string using buttons and/or voice commands, according to the available input devices of the IoT device. Passwords can likewise be entered using buttons or voice. If instead of a token, the verification method is biometric information, the user could input biometric information on an IoT device equipped with biometric sensors (e.g., fingerprint sensors).

In step 318, the IoT device passes the token to the second lambda service. Using this token, the second lambda service can lookup the session ID in the database associated with that verification token in step 320. In step 322, the second lambda service writes the hardware ID associated with the device to the database so that the hardware ID is now associated with the session ID. For example, in FIG. 2, second lambda service 272 writes the hardware ID to database 290.

Figure 4:
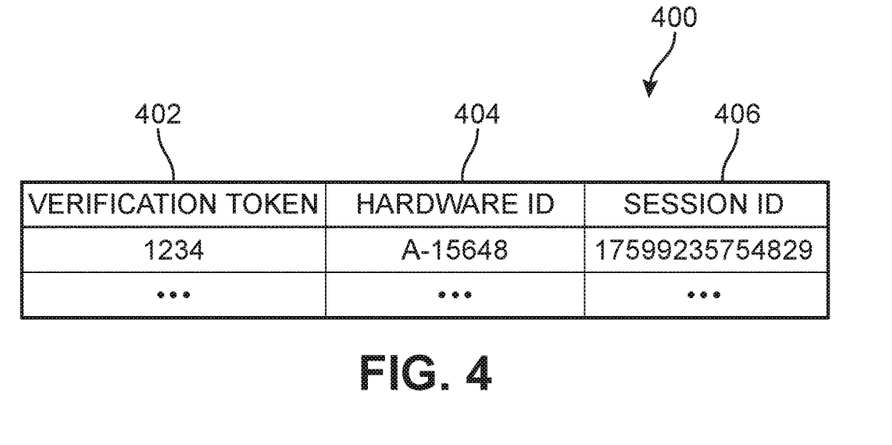
FIG. 4 is a schematic view of a portion of a database table, according to an embodiment.

FIG. 4 depicts a schematic view of a portion of a database table 400. Database table 400 may be associated with entries in a database (such as database 190 of FIG. 1 or database 290 of FIG. 2). Database table 400 includes a verification token column 402, a hardware ID column 404 and a session ID column 406. In other embodiments using a different verification method, another suitable verification column could be used. The verification token (or more general verification method), as discussed above, may be used during an initial verification process to ensure an IoT device or any other device is permitted to send commands or other information to the client device. However, once the verification token has been provided once, the additional hardware ID column allows the verified IoT device to obtain the session ID without requiring the user to re-enter the verification token. This also eliminates any need for the second application running on the control device (e.g., an app running on an IoT device) to store the token. Because the database architecture supports global secondary indexes, the session ID can be quickly found using either the verification token or the hardware ID. That is, the second lambda service can quickly retrieve the session ID based on the token-session ID pair or the hardware ID-session ID pair. Without this configuration, the database would have to be scanned to find the session ID that corresponds to the provided token or hardware ID, thereby reducing performance of the system.

Figure 5:
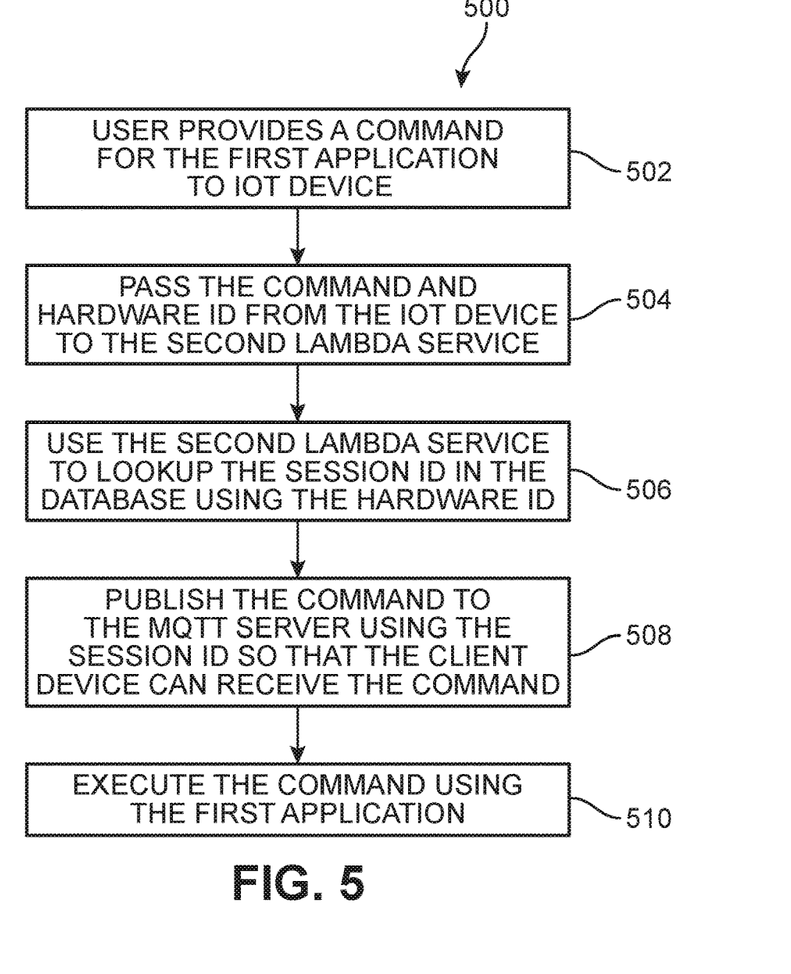
FIG. 5 is a schematic view of a process for sending commands from one application to another application within a serverless infrastructure.

FIG. 5 is a schematic view of a process 500 for transmitting commands from a second application running on an IoT device (or any other control device) to a first application running on a client device. It may be appreciated that this process may occur after the IoT device has been verified, so that the session ID can be found using the hardware ID of the IoT device rather than requiring the use of a token.

The process begins at step 502 when the user provides a command to the IoT device. The command could be any command that may be understood and executed by the application running on the client device. For example, if client is running a web application, the user could issue a command to change the page, click on a particular link or perform any other functionality that is recognized by the web application.

The command can be provided in any format that can be received by the control device. If the control device is a desktop computer, laptop or tablet, the command could be entered using (real or virtual) keys. If the control device is a smart voice assistant, the command could be provided as an audible command. For example, a user could say "Alexa, click on the 'Next page' link" if the control device is an Amazon Alexa.

Next, in step 504, the IoT device passes the command along with its own hardware ID to the second lambda service. The second lambda service uses the hardware ID to lookup the corresponding session ID in the database in step 506. Then the second lambda service publishes the command to the MQTT server along with the session ID in step 508. At this point the first application running on the client will receive the commands via communication with the MQTT server. For example, the client device and the MQTT server are communicating through WebSockets, messages (including commands) from the control device may be delivered in real time.

Finally, in step 510, the first application can execute the commands thereby allowing the first application to be controlled by the second application running on the IoT device.

In some embodiments, once the client device ends the session, this will be reflected in the database and the IoT device will no longer have access to the session. For example, when the client device ends the session with the application, the first lambda service or the second lambda service may delete the corresponding session ID and/or hardware ID in the database. If the IoT device passes another command to the second lambda service, the session ID will no longer be available (or accessible) within the database and no messages will be sent.

It may be appreciated that the exemplary methods can be used to control multiple client devices using a single control device. This can be achieved by configuring the multiple different clients to each connect (i.e., subscribe) to a common application session (or messaging channel associated with a particular application session) using a unique session identifier. Messages published to the MQTT server using the session identifier will then be available to any clients subscribing to the session. More specifically, any commands passed from the control device to the MQTT server will be received and executed by each of the applications running on the multiple clients. Such a configuration could be useful in a virtual meeting, by allowing a single user to send control commands to multiple different client devices being viewed by other attendants of the meeting.

The exemplary methods can also be used to facilitate control of a single application on a client device using multiple control devices. In such a configuration, a single lambda service could be used to write a verification token and session information to a database. Each control device with a valid token may then be able to retrieve the appropriate session ID (using a lambda service) and publish messages with commands to the MQTT server for retrieval by the client. In one exemplary use case, a user running an application on a client device could share his or her screen with multiple attendees at a virtual meeting. Different users could then send commands via their own control devices to be executed on the client device, thereby allowing all attendees to interact with the application.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method of controlling a first application running on a client device using commands generated by a second application running on a control device in a serverless infrastructure, the control device including a device identifier, the method comprising:
    establishing a connection between the first application and a server configured to accommodate a break in connection between the client device and the control device, wherein the connection is associated with a session identifier;
    sending the session identifier from the server to a first lambda service, the first lambda service having access to verification information associated with the session identifier;
    storing the session identifier and the verification information, using the first lambda service, in a database;
    receiving the verification information at the second application running on the control device;
    sending the verification information to a second lambda service;
    using the second lambda service to store the device identifier on the database, wherein the second lambda service uses the verification information to associate the device identifier with the session identifier;
    receiving a command intended for use by the first application at the second application running on the control device;
    sending the command to the second lambda service;
    using the second lambda service to retrieve the session identifier from the database, wherein the device identifier is used to find the session identifier;
    sending the command and the session identifier, using the second lambda service, to the server so that the first application can receive the command from the server; and
    executing the command using the first application.

2. The method according to claim 1, wherein the first application is a web application running in a browser on the client device.

3. The method according to claim 2, wherein:
    the first application is in communication with an application server and is configured to control a third application running on the application server; and
    wherein the command received at the second application is used by the web application to control the third application running on the application server.

4. The method according to claim 1, wherein the control device is an Internet of Things device.

5. The method according to claim 1, wherein the control device is configured to receive voice commands.

6. The method according to claim 1, wherein the verification information is a password provided by the client.

7. The method according to claim 1, wherein the verification information is biometric information provided by the client, and wherein the control device is configured to receive biometric information.

8. The method according to claim 1, wherein the verification information is a verification token, and wherein the method further comprises:
    generating the verification token using the first lambda service;
    sending the verification token, using the first lambda service, to the server so that the first application running on the client device can retrieve the verification token from the server; and
    providing the verification token to a user of the client device.

9. A non-transitory computer-readable medium storing software comprising instructions executable by one or more computers which, upon such execution, cause the one or more computers to:
    establish a connection between a first application running on a client device and a server, wherein the connection is associated with a session identifier;
    send the session identifier from the server to a first lambda service;
    store the session identifier, using the first lambda service, together with corresponding verification information in the database;
    receive the verification information at a second application running on a control device, the control device including a device identifier;
    send the verification information to a second lambda service;
    use the second lambda service to store the device identifier on the database, wherein the second lambda service uses the verification information to associate the device identifier with the session identifier;
    receive a command intended for use by the first application at the second application running on the control device;
    send the command to the second lambda service;
    use the second lambda service to retrieve the session identifier from the database based on the device identifier;
    send the command and the session identifier, using the second lambda service, to the server so that the first application can receive the command over the established connection; and
    execute the command using the first application.

10. The non-transitory computer-readable medium according to claim 9, the software instructions further executable to:
    generate the verification information using the first lambda service;
    send the verification information, using the first lambda service, to the server so that the first application can retrieve the verification information using the established connection; and
    provide the verification token to a user of the client device.

11. A system for controlling a first application using commands generated by a second application in a serverless infrastructure, the system comprising:
- a client device running the first application;
- a control device running the second application, the control device having a device identifier;
- a server in communication with the client device;
- a database;
- a first lambda service in communication with the server and the database;
- a second lambda service in communication with the server, the database, and the control device;
- wherein the client device establishes a connection between the first application and the server, the connection being associated with a session identifier;
- wherein the server sends the session identifier to the first lambda service, the first lambda service having access to verification information associated with the session identifier;
- wherein the lambda service stores the session identifier and the verification information in the database;
- wherein the second application receives the verification information from a user and sends the verification information to the second lambda service;
- wherein the second lambda service stores the device identifier in the database and wherein the second lambda service uses the verification information to associate the device identifier with the session identifier;
- wherein the second application running on the control device receives a command from the user, wherein the command is intended for use by the first application running on the client device;
- wherein the second application sends the command to the second lambda service;
- wherein the second lambda service uses the device identifier to retrieve the session identifier from the database;
- wherein the second lambda service sends the command and the session identifier to the server;
- wherein the server sends the command and the session identifier to the first application running on the client device; and
- wherein the first application executes the command after receiving the command from the server.

12. The system according to claim 11, wherein the verification information is a verification token generated by the first lambda service, and wherein the first lambda service sends the verification token to the server for retrieval by the client device.

13. The system according to claim 11, wherein the verification information is a password provided by the client device.

14. The system according to claim 11, wherein the verification information is biometric information provided by the client device, and wherein the control device can receive biometric information.

15. The system according to claim 11, wherein the control device is an internet of things device.

16. The system according to claim 11, wherein the control device is an intelligent voice assistant.

17. The system according to claim 11, wherein the first application is a web application.

18. The system according to claim 11, wherein the server facilitates messages between the client device, the first lambda service and the second lambda service using a message queuing telemetry transport protocol.

19. The system according to claim 18, wherein the second lambda service is configured to publish messages to the server, and wherein the messages include at least one command and the session identifier.

20. The system according to claim 11, wherein the system includes another client device running another first application, and wherein the another client device can also communicate with the server and receive commands from the second application running on the control device.

* * * * *